United States Patent
Polaganga et al.

(10) Patent No.: US 11,711,704 B1
(45) Date of Patent: Jul. 25, 2023

(54) METHOD AND SYSTEM FOR OPTIMIZING NETWORK RESOURCES

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US); Rishitha Ponugoti, Kirkland, WA (US); Deepak Nadh Tammana, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 132 days.

(21) Appl. No.: 17/201,176

(22) Filed: Mar. 15, 2021

(51) Int. Cl.
| | |
|---|---|
| *H04W 24/02* | (2009.01) |
| *H04W 28/06* | (2009.01) |
| *H04B 17/309* | (2015.01) |
| *H04L 43/0876* | (2022.01) |
| *H04L 43/16* | (2022.01) |
| *H04W 24/08* | (2009.01) |

(52) U.S. Cl.
CPC .......... *H04W 24/02* (2013.01); *H04B 17/309* (2015.01); *H04L 43/0876* (2013.01); *H04L 43/16* (2013.01); *H04W 24/08* (2013.01); *H04W 28/06* (2013.01)

(58) Field of Classification Search
CPC ..... H04W 24/02; H04W 24/08; H04W 28/06; H04B 17/309; H04L 43/0876; H04L 43/16
See application file for complete search history.

(56) References Cited

U.S. PATENT DOCUMENTS

| | | | |
|---|---|---|---|
| 8,676,956 B1 * | 3/2014 | Johnson | H04L 43/16 359/220.1 |
| 10,211,907 B1 * | 2/2019 | Oroskar | H04L 43/16 |
| 10,298,505 B1 * | 5/2019 | Grant | H04L 43/16 |
| 10,432,798 B1 * | 10/2019 | Wong | H04W 4/24 |
| 10,477,367 B2 | 11/2019 | Blankenship et al. | |
| 10,660,151 B2 | 5/2020 | Futaki | |
| 2009/0161545 A1 * | 6/2009 | Ho | H04W 28/10 455/452.2 |
| 2012/0195356 A1 * | 8/2012 | Yi | H04N 19/156 375/240.03 |
| 2012/0224483 A1 * | 9/2012 | Babiarz | H04L 43/0894 370/232 |

(Continued)

OTHER PUBLICATIONS

M. Lauridsen, I. Z. Kovacs, P. Mogensen, M. Sorensen and S. Holst, "Coverage and Capacity Analysis of LTE-M and NB-IoT in a Rural Area," 2016 IEEE 84th Vehicular Technology Conference (VTC-Fall), 2016, pp. 1-5, doi: 10.1109/VTCFall.2016.7880946 (Year: 2016).*

*Primary Examiner* — Kyaw Z Soe
(74) *Attorney, Agent, or Firm* — Jones Robb, PLLC

(57) ABSTRACT

Systems and methods are provided for optimizing network resources. The method includes setting a first resource usage threshold for wireless devices connected to an access node. The method additionally includes monitoring resource usage of the connected wireless devices and comparing the monitored resource usage to the first resource usage threshold. The method further includes dynamically restricting wireless device access to at least one area characterized by signal performance parameters in a first predetermined range when the monitored resource usage meets the first resource usage threshold.

20 Claims, 7 Drawing Sheets

(56) References Cited

U.S. PATENT DOCUMENTS

| | | | | |
|---|---|---|---|---|
| 2013/0183995 | A1* | 7/2013 | Smith | H04W 16/14 455/452.2 |
| 2014/0192653 | A1* | 7/2014 | Jung | H04L 67/1001 370/236 |
| 2014/0355428 | A1* | 12/2014 | Smith | H04W 28/0231 370/230 |
| 2015/0141024 | A1* | 5/2015 | Kapnadak | H04W 16/18 455/446 |
| 2015/0141027 | A1* | 5/2015 | Tsui | H04W 24/02 455/452.1 |
| 2016/0095126 | A1* | 3/2016 | Sridhar | H04W 28/08 370/328 |
| 2016/0174125 | A1* | 6/2016 | Kobayashi | H04W 36/22 370/332 |
| 2017/0289840 | A1* | 10/2017 | Sung | H04W 24/04 |
| 2018/0295633 | A1* | 10/2018 | Abdelmonem | H04B 17/345 |
| 2019/0021020 | A1* | 1/2019 | Kim | H04W 52/0229 |
| 2019/0140933 | A1* | 5/2019 | Guim Bernat | H04L 47/2425 |
| 2019/0166032 | A1* | 5/2019 | Inbaraj | H04L 43/0876 |
| 2019/0253100 | A1 | 8/2019 | Liu et al. | |
| 2020/0252809 | A1 | 8/2020 | Patil et al. | |
| 2021/0352517 | A1* | 11/2021 | Wang | H04W 16/28 |
| 2022/0104119 | A1* | 3/2022 | Chiselko | H04W 24/02 |

\* cited by examiner

METHOD AND SYSTEM FOR OPTIMIZING NETWORK RESOURCES

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

Additionally, in recent years, networks have evolved to connect with the Internet of things (IoT), which describes the network of physical objects or things that are embedded with sensors, software, and other technologies for the purpose of connecting and exchanging data with other devices and systems over the Internet. Cellular IoT is a way of connecting physical things, such as sensors to the internet by having them utilize the same mobile networks as wireless devices. In the consumer market, IoT technology is frequently utilized to equip the "smart home", including devices and appliances such as lighting fixtures, thermostats, home security systems and cameras, and other appliances that support one or more common ecosystems, and can be controlled via devices associated with that ecosystem, such as smartphones and smart speakers. Cellular IoT itself is a rapidly growing ecosystem based on 3GPP global standards, supported by an increasing number of mobile network providers as well as device, chipset, module, and network infrastructure vendors. It improves over other Low Power Wide Area (LPWA) network technologies in terms of quality of service (QoS), scalability, and flexibility.

Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies are often used in combination with newer technologies such. Cellular IoT applications generally use one of two technologies: narrow-band (NB)-IoT and Cat-M1, which are both 3GPP standardized technologies. The technologies address different types of use cases based on their capabilities.

NB-IoT supports devices with very narrow bandwidth, 200 kHz. Due to its narrow bandwidth, the data rate peaks at around 250 kilobits per second (kbps). An NB-IoT carrier can be deployed even in guard-band of an LIE carrier. Common use cases of NB-IoT include utility meters and sensors. NB-IoT provides advantages including low complexity, low cost, ubiquitous coverage, low data rate and low power computing. NB-Ica is particularly suitable for transferring small amounts of information as it uses only a narrow band. With extreme coverage capability, NB-IoT is ideal for supporting very low data rate applications in extremely challenging radio conditions.

Cat-M1 operates at 1.4 MHz bandwidth with higher device complexity/cost than NB-IoT. The wider bandwidth allows Cat-M1 to achieve greater data rates (up to 1 Mbps), lower latency and more accurate device positioning capabilities. Cat-M1 supports voice calls and connected mode mobility. Common uses cases for Cat-M1 include connected vehicles, wearable devices, trackers, and alarm panels. Both NB-IoT and Cat-M1 devices can sleep for extended periods of time, which greatly reduces device power consumption.

Both Cat M1 and NB-IoT have a concept called coverage enhancement (CE) levels. These CE levels may be configured, for example, based on pathloss ranges experienced by devices in the impacted areas. UEs connected in higher CE levels take up more resources than UEs in lower CE levels. Generally, CE levels are configured per UE and can often result in poor resource utilization. For example, when multiple NB-IoT UEs are near a cell edge and are configured for a high CE level, the access node ends up using a large portion of resources to serve these UEs while rejecting NB-IoT devices that are closer to the access node with good signal conditions and configured for a lower CE level. These scenarios are predominant for NB-IoT use cases due to the fact that cell bandwidth in NB-IoT is narrow, i.e. limited to 200 kHz. Thus, a solution is needed for dynamically optimizing network resources for these technologies.

Overview

Exemplary embodiments described herein include systems, methods, and access nodes for dynamically controlling wireless device access to specific areas, wherein the areas are defined by a signal performance parameter range, e.g., a pathloss range. A method for optimizing network resources includes setting a first resource usage threshold for wireless devices connected to an access node. The method additionally includes monitoring resource usage of the connected wireless devices and comparing the monitored resource usage to the first resource usage threshold. The method further includes dynamically restricting wireless device access to at least one area characterized by signal performance parameters in a first predetermined range when the monitored resource usage meets the first resource usage threshold.

In a further exemplary embodiment, a method is provided for optimizing network resources. The method includes setting a first resource usage threshold and a second resource usage threshold for wireless devices connected to an access node, wherein the first and second resource usage thresholds include a PRB utilization percentage. The method additionally includes monitoring resource usage of the connected wireless devices and comparing the monitored resource usage to the first resource usage threshold. The method further includes comparing the monitored resource usage to the second resource usage threshold when the monitored resource usage meets the first resource usage threshold. When the monitored resource usage meets the first resource usage threshold and not the second resource usage threshold, the method includes dynamically restricting wireless device access to a first area characterized by signal performance parameters in a first predetermined range. When the monitored resource usage meets the first and second thresholds, the method includes dynamically restricting wireless device access to the first area and a second area having signal performance parameters in a second predetermined range.

In yet a further exemplary embodiment, a system is provided for optimizing network resources. The system includes an access node including at least one processor programmed to perform multiple steps. The steps include setting a first resource usage threshold for wireless devices connected to an access node and monitoring resource usage of the connected wireless devices. The method further includes comparing the monitored resource usage to the first resource usage threshold and dynamically restricting wireless device access to at least one area characterized by signal performance parameters in a first predetermined range when the monitored resource usage meets the first resource usage threshold.

In embodiments set forth herein, areas with particular signal performance parameter ranges may correspond to CE levels. Furthermore, particular signal performance parameters may include reference signal received power (RSRP) and/or pathloss. Thus, an area where pathloss is highest and RSRP is the lowest corresponds to a highest CE level and an area where pathloss is lowest and RSRP is the highest may correspond to a lowest CE level.

DETAILED DESCRIPTION

Figure 1:
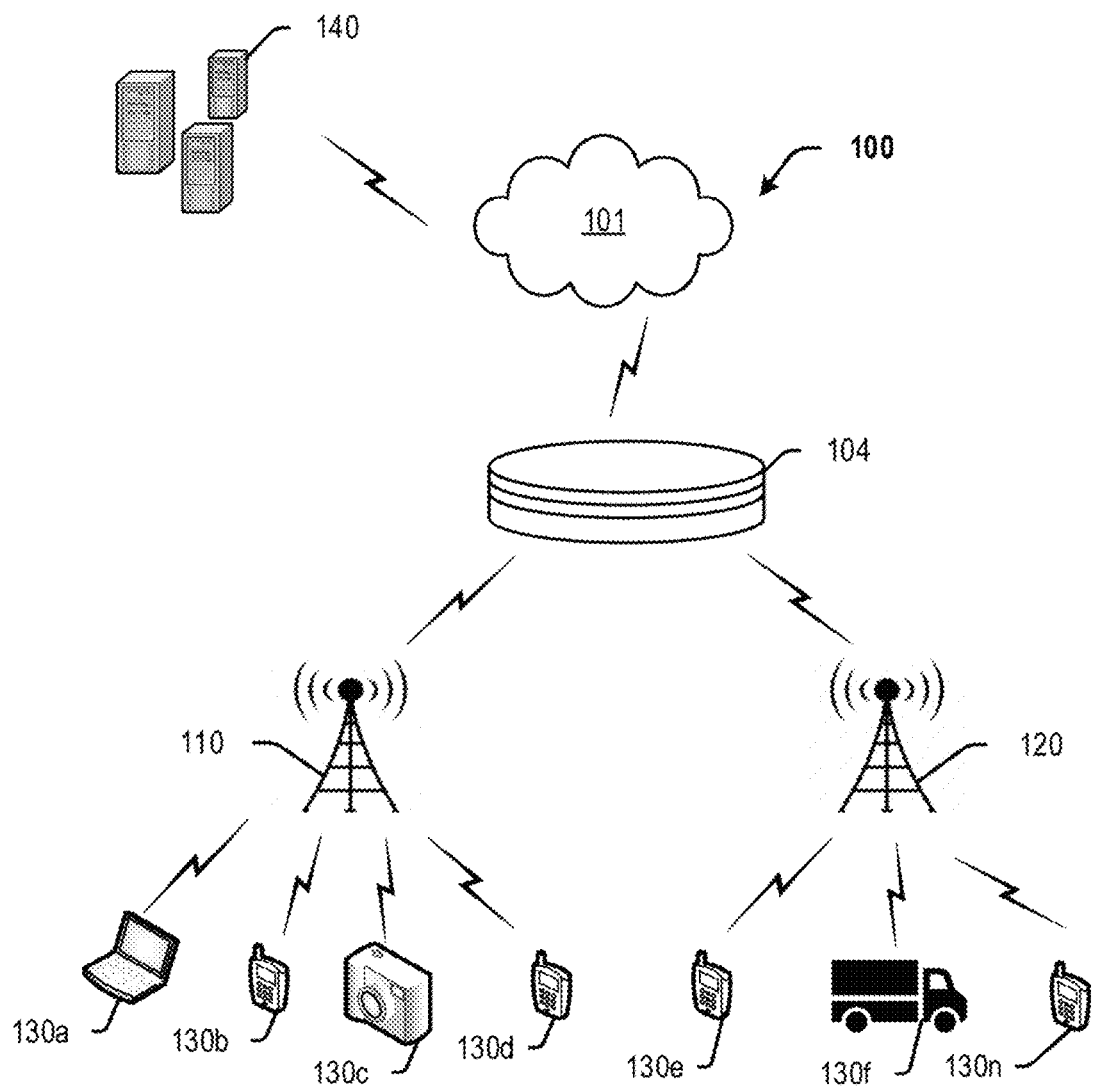
FIG. 1 depicts an exemplary system for wireless communication, in accordance with the disclosed embodiments.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Because certain network conditions are likely to result in poor performance of wireless devices in the network and further to deplete network resources, embodiments provided herein dynamically restrict UE access from particular locations with specific network conditions based on predetermined resource usage thresholds. The restriction may be dynamically performed based on continuously monitored resource usage.

Exemplary embodiments described herein include systems and methods for dynamically restricting UEs in particular locations from connecting to an access node utilizing a particular RAT based on available network resources. For example, embodiments as set forth herein prohibit UEs using a narrowband technology, such as NB-IoT, from connecting to an access node using that technology when resource block usage for NB-IoT is above a particular level. The level may be defined, for example, as a percentage of resource block usage allotted to a particular RAT, such as NB-IoT. For example, once 50% of resource blocks allotted to NB-IoT technologies are utilized, the method dynamically restricts UEs utilizing NB-IoT technology from connecting to the access node using the NB-IoT technology from certain locations having particular signal performance parameter ranges.

In embodiments set forth herein, specific areas are defined within the network in which UE access may be dynamically restricted. For example, multiple areas may be defined based on a path loss range in each area. The areas may alternatively be defined based on RSRP. In further embodiments, the areas may be defined by both pathloss and RSRP or by other signal performance parameters. An area in close proximity to an access node typically experiences less path loss and higher RSRP than areas further from the access node. Multiple areas having different path loss ranges and/or RSRP ranges may be defined within a coverage area of an access node. In embodiments set forth herein, the specific areas may correspond to CE levels. For example, a first CE level closest to the access node has a first pathloss range and RSRP range, a second CE level further from the access node has a second pathloss range and RSRP range, and a third CE level bordering the coverage area edge of the access node has a third pathloss range and RSRP range.

Additionally, in accordance with embodiments set forth herein, at least one resource usage threshold is defined within the network. The resource usage threshold may be or include a percentage of resource block utilization. Alternatively, the resource usage threshold may be set to equal a number of UEs connected to an access node utilizing a particular technology. In embodiments set forth herein, two resource usage thresholds are set. Both thresholds may be set based on a percentage of resource block utilization. Alternatively, both thresholds may be set based a number of UEs connected to the access node utilizing a particular technology. As a further alternative, two different types of resource utilization thresholds may be set, for example, one threshold may be a percentage of resource block utilization and another threshold may be a number of UEs connected to the access node utilizing a particular technology. Furthermore, the threshold may correspond to a number of UEs connected to an access node from one or more of the pre-defined areas having particular signal performance parameter ranges.

In further embodiments, a processor or processing node associated with an access node monitors a number of radio resource configuration (RRC) connected UEs utilizing a narrowband technology from an access node or monitors resource utilization of the connected UEs. The access node dynamically restricts UEs in at least one higher order CE level from accessing the narrowband technology when resource usage exceeds a predetermined threshold in order to optimize network resources.

Further, in embodiments set forth herein, the access node monitors resource usage as set forth above. If the resource usage meets a first predetermined threshold, the access node may dynamically restrict UEs in a pre-defined area from connecting to the access node. The pre-defined area may, for example be an area at located nearest to the edge of the coverage area of the access node. Accordingly, any UEs in the predefined area requesting connection to the access node utilizing the particular technology will be denied access using that technology. Further, upon determining that resource usage meets the first predetermined threshold, the access node may continue to monitor resource usage to determine if it meets a second predetermined threshold, wherein the second predetermined threshold is greater than the first predetermined threshold. When the resource usage meets both the first and second predetermined thresholds, the access node may dynamically restrict UE access from a second predetermined area in addition to the first predetermined area. The second predetermined area may be, for example, an area adjacent the first predetermined area. Additionally, in embodiments set forth herein, the access node continues to service UEs already connected prior to the threshold determination regardless of the location of the already connected UEs.

Thus, embodiments disclosed herein may operate in an IoT cellular network utilizing technologies offering CE levels, such as NB-IoT and Cat M1. Through embodiments set forth herein, multiple objectives can be achieved. For example, reverse noise rise at the access node can be reduced. Additionally, service parameters to already connected UEs are improved and service delay is decreased. Furthermore, battery savings are achieved for already connected UEs and efficient resource utilization is optimized within the network.

Therefore, in accordance with embodiments disclosed herein, methods and systems identify resource usage thresholds within the network and monitor resource usage to determine if the thresholds are met. Methods and systems identified herein dynamically restrict wireless device access from particular predefined areas based on this determination in order to optimize network resources.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as sensors that may be connected to a network as an IoT device.

The terms "path loss" in data communication may refer to the reduction in power density of an electromagnetic wave as it propagates through space. Path loss may be due to many effects, including, for example, refraction, diffraction, reflection, and absorption. Path loss may be impacted by environmental factors and terrain contours, the distance between the transmitter and the receiver, and the height and location of antennas.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of dynamically restricting wireless device access based on monitored resource usage may be implemented as computer-readable instructions or methods, and processing nodes on the network for executing the instructions or methods. The processing node may include a processor included in the access node or a processor included in any controller node in the wireless network that is coupled to the access node.

Embodiments disclosed herein operate in a network supporting NB-IoT, which is configured for a high volume of low-complexity devices. NB-IoT can effectively serve devices in challenging radio environments such as deep building or underground radio signal penetration. UEs can be specifically configured with a chipset supporting NB-IoT. Further, embodiments supposed herein operate in a network supporting Cat-M1, which is also supported by devices having a particular chipset. Cat-M1 supports lower data-rate applications and is appropriate for low-power sensing and monitoring devices such as health and fitness wearables, utility meters, and vending machines, tracking, and other applications. Cat-M1 offers a lower bandwidth than most cellular services, although higher than NB-IoT applications.

FIG. 1 depicts an exemplary system 100 for use in conjunction with embodiments disclosed herein. The system 100 may include an IoT cloud platform 101, a core network 104, one or more IoT base stations or access nodes 110, 120, and multiple IoT terminals, devices, or UEs 130a . . . n. Other computing systems and devices 140 may be connected to the IoT platform 101 in order to control and/or monitor the multiple IoT terminals 130a . . . n.

The IoT cloud platform 101 may perform processing and forward results to computing systems and devices 140 and/or IoT connected devices 130a . . . n. The IoT core network 104 connects with the cloud platform 101 and the one or more IoT base stations or access nodes 110, 120. Characteristics of the IoT base stations 110, 120 are further described below with respect to FIG. 2.

The IoT devices 130a . . . n are devices configured with appropriate technologies for connecting to the IoT cloud platform 101. The IoT devices 130a . . . n may be or include smart phones and may also include low-complexity devices designed to communicate infrequently. For example, connected devices 130a . . . n may include low-cost sensors, meters, wearables, and trackers. Many of these devices 130a . . . n can be deployed in challenging radio environments, such as a basement of a building or on a moving piece of machinery. In some instances, the devices 130a . . . n may send occasional signals for several years without a change of battery. The IoT core network 104 can collect and analyze data from the connected devices 130a . . . n sensors for real-time monitoring, GPS tracking, mobile route tracking, power usage monitoring, etc.

In embodiments set forth herein, the base stations 110, 120 and the connected devices 130a . . . n may be configured to operate using NB-IoT and/or Cat-M1 technologies. NB-IoT supports ultra-low complexity devices with a narrow bandwidth of 200 kHz. Due to its narrow bandwidth, the data rate peaks at around 250 kbps. An NB-IoT carrier can be deployed in three ways including (1) stand-alone; (2) guard-band; and in-band. The stand-alone mode allows deployment in a dedicated spectrum. The guard-band deployment occurs using the guard band of an LTE carrier, thereby enabling use of a spectrum that is otherwise unused. In-band operation allows NB-IoT to operate using one physical resource block (PRB) of an LTE carrier. Cat-M1 operates at 1.4 MHz bandwidth and typically Cat M1 devices have a higher complexity and cost than NB-IoT devices. The wider bandwidth allows Cat-M1 to achieve greater data rates and lower latency, with more accurate device positioning capabilities. In-band operation for Cat-M1 may be implemented using six PRBs of an LIE carrier.

Both NB-IoT and Cat-M1 devices can sleep for extended periods of time with extended Discontinuous Reception (eDRX) and Power Saving Mode (PSM) functionalities, which greatly reduces device power consumption. Furthermore, both technologies support enhanced signal coverage per base station. With extreme coverage capability, NB-IoT is ideal for supporting very low data rate applications in extremely challenging radio conditions. Devices, such as the devices 130a . . . n may be equipped with a particular chipset designed to utilize NB-IoT or Cat M1 technology.

NB-IoT and Cat-M1 technologies offer coverage extension beyond existing cellular technologies. Reliable coverage enhancement is achieved by the repeated transmission of data and control signaling. Each transmission can be configured to repeat for a designated number of times in order to achieve higher success opportunities at the defined coverage level. When path loss at the desired coverage area is high, a greater number of repetitions can be configured. The network can configure up to three coverage enhancement (CE) levels (CE0, CE1, CE2) to serve the connected devices 130a . . . n. Thus, in the different CE levels, a message may be repeated a different number of times. If the device resides in a CE level with lower path loss and higher RSRP, the signal is repeated fewer times than when the device is located in area with higher path loss and lower RSRP. The CE levels aim to ensure that a good signal quality is received in all locations.

Figure 2:
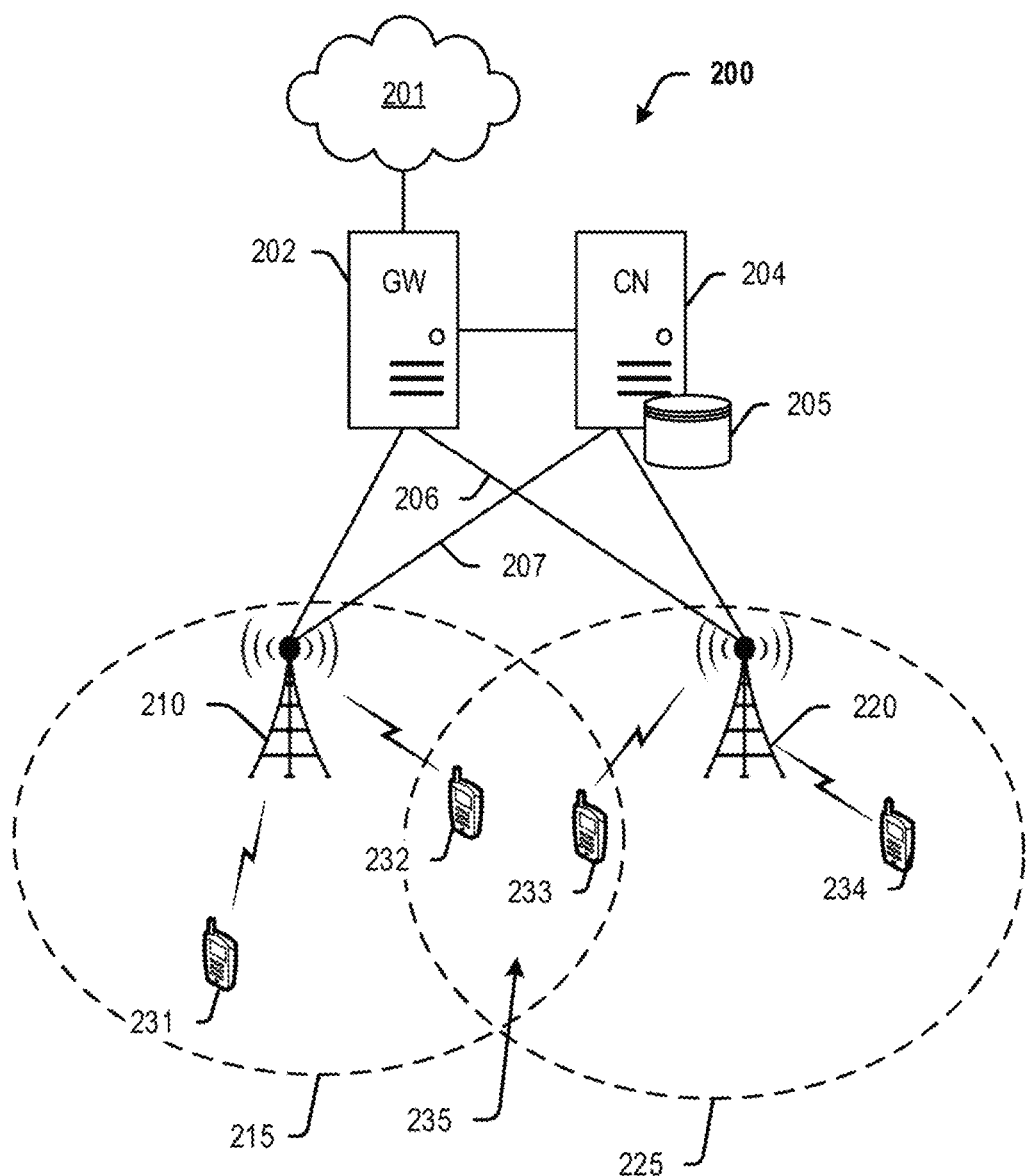
FIG. 2 illustrates an exemplary configuration of a system for wireless communication in accordance with the disclosed embodiments.

FIG. 2 depicts an exemplary system 200 for use in conjunction with embodiments disclosed herein. System 200 comprises a communication network 201, gateway 202, controller node 204, access nodes 210 and 220, and wireless devices 231, 232, 233, and 234. Access node 210 is illustrated as having a coverage area 215. Thus, access node 210 is configured to deploy radio air interfaces within the first coverage area 215. In embodiments disclosed herein, the access node 210 may deploy multiple radio air interfaces utilizing different RATs, different frequency bands, and over different coverage areas.

Access node 220 is illustrated as having a coverage area 225 overlapping with the coverage area 215 of the access node 210. Thus, access node 220 deploys a radio air interface within the coverage area 215. In embodiments disclosed herein, the access node 220 may deploy multiple radio air interfaces using different RATs, such as, for example, NB-IoT, Cat M1, 4G, and 5G, different frequency bands, and different coverage areas.

As shown herein, wireless devices 231, 232 attach to access node 210 and wireless devices 233, 234 attach to access node 220. Although access nodes 210, 220 and wireless devices 231, 232, 233, 234 are illustrated in FIG. 2, any number of access nodes and wireless devices can be implemented within system 200.

Wireless devices 231, 232, are located within coverage area 215 and access network services from access node 210. Wireless device 233 and 234 are located within coverage area 225 and access network services from access node 220. Further, wireless devices 232 and 233 are located within potential interference area 235 formed by an overlap of coverage areas 215, and 225. For example, access nodes 210, 220 may be configured to deploy individual sectors and potential interference area 235 may comprise any overlapping coverage area of the sectors and may be located at or near an edge of coverage area in an area of high pathloss and in a high CE level, e.g., CE level 2. In accordance with embodiments set forth herein, the access node 210 may monitor resource usage of the wireless devices 231-234 and dynamically restrict access to the area 235 in order to optimize network resources.

Further, a scheduling entity (within, for example, one or both of access nodes 210, 220, or controller node 204) may be configured to allocate resources to improve overall network resource utilization and performance, for example by restricting access to high path loss area 235. For example, if wireless devices 231 and 232 are using more than 50% of the resources available for a particular IoT technology, the scheduling entity may restrict access to the area 235 for any addition devices, such as device 233. In embodiments disclosed herein, one or more of access nodes 210, 220 may comprise logic for performing operations for evaluating resource usage and determining areas of high path loss such as potential interference area 235 between coverage areas 215 and 225. While the potential interference area 235 is shown as an exemplary undesirable area experiencing high path loss, other types of undesirable areas are within the scope of the disclosure. For example, in addition to areas of overlapping coverage, undesirable areas may include areas with high interference or areas with a weak signal, such as a cell edge, which is an area defined as being within a predetermined distance from the edge of a coverage area.

Access nodes 210, 220 can be any network node configured to provide communication between wireless devices 231-234 and communication network 201, including standard access nodes and/or short range, low power, small access nodes. For instance, access nodes 210, 220 may include any standard access node, such as a macrocell access node, base transceiver station, a radio base station, next generation NodeBs (gNBs) in 5G networks, or enhanced eNodeBs (eNBs) in 4G/LTE networks, or the like. In an exemplary embodiment, a macrocell access node can have a coverage area 215, 225 in the range of approximately five kilometers to thirty five kilometers and an output power in the tens of watts. In other embodiments, access nodes 210, 220 can be a small access node including a microcell access node, a picocell access node, a femtocell access node, or the like such as a home NodeB or a home eNodeB device. Moreover, it is noted that while access nodes 210, 220 are illustrated in FIG. 2, any number of access nodes can be implemented within system 200.

Access nodes 210, 220 can comprise processors and associated circuitry to execute or direct the execution of computer-readable instructions to perform operations such as those further described herein. Briefly, access nodes 210, 220 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 210, 220 can receive instructions and other input at a user interface. Access nodes 210, 220 communicate with gateway node 202 and controller node 204 via communication links 206, 207. Access nodes 210, 220 may communicate with each other and with other access nodes (not shown) using a direct link such as an X2 link or similar.

Wireless devices 231-234 may be any device, system, combination of devices, or other such communication platform capable of communicating wirelessly with access nodes 210, 220 using one or more frequency bands deployed therefrom, such as for example, a band dedicated to NB-IoT technology. Wireless devices 231-234 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 210, 220. As set forth above, the wireless devices can be sensors, meters, or other IoT devices. Other types of communication platforms are possible.

Communication network 201 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 201 can be capable of carrying data, for example, to support voice, push-to-talk, broadcast video, and data communications by wireless devices 231-234. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 201 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 201 can also comprise additional base stations, controller nodes, telephony switches, internet routers, network gateways, computer systems, communication links, or some other type of communication equipment, and combinations thereof.

Communication links 206, 207 can use various communication media, such as air, space, metal, optical fiber, or some other signal propagation path—including combinations thereof. Communication links 206, 207 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 206, 207 may include Si communication links. Other wireless protocols can also be used. Communication links 206, 207 can be a direct link or might include various equipment, intermediate components, systems, and networks. Communication links 206, 207 may comprise many different signals sharing the same link.

Gateway node 202 can be any network node configured to interface with other network nodes using various protocols. Gateway node 202 can communicate user data over system 200. Gateway node 202 can be a standalone computing device, computing system, or network component, and can be accessible, for example, by a wired or wireless connection, or through an indirect connection such as through a computer network or communication network. For example, gateway node 202 can include a serving gateway (SGW) and/or a public data network gateway (PGW), etc. One of ordinary skill in the art would recognize that gateway node 202 is not limited to any specific technology architecture, such as Long Term Evolution (LTE) or 5G NR can be used with any network architecture and/or protocol.

Gateway node 202 can comprise a processor and associated circuitry to execute or direct the execution of computer-readable instructions to obtain information. Gateway node 202 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 202 can receive instructions and other input at a user interface.

Controller node 204 can be any network node configured to communicate information and/or control information over system 200. Controller node 204 can be configured to transmit control information associated with resource usage thresholds. Controller node 204 can be a standalone computing device, computing system, or network component, and can be accessible, for example, by a wired or wireless connection, or through an indirect connection such as through a computer network or communication network. For example, controller node 204 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 204 is not limited to any specific technology architecture, such as Long Term Evolution (LTE) or 5G NR can be used with any network architecture and/or protocol.

Controller node 204 can comprise a processor and associated circuitry to execute or direct the execution of computer-readable instructions to obtain information. Controller node 204 can retrieve and execute software from storage, which can include a disk drive, a flash drive, memory circuitry, or some other memory device, and which can be local or remotely accessible. In an exemplary embodiment, controller node 204 includes a database 205 for storing information, such as coordinates of pre-defined areas based on path loss characteristics and pre-determined resource usage thresholds utilized for dynamically restricting device access to the predefined areas including potential interference area 235, as well as positions and characteristics of wireless devices 231-234. The database may further store handover thresholds, scheduling schemes and resource allocations for each of access nodes 210, 220 and wireless devices connected thereto, and so on. This information may be requested by or shared with access nodes 210, 220 via communication links 206, 207, X2 connections, and so on. The software comprises computer programs, firmware, or some other form of machine-readable instructions, and may include an operating system, utilities, drivers, network interfaces, applications, or some other type of software, and combinations thereof. Controller node 204 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 210, 220 and communication network 201.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 200 may be, comprise, or include computers systems and/or processing nodes, including access nodes, controller nodes, and gateway nodes described herein.

Figure 3:
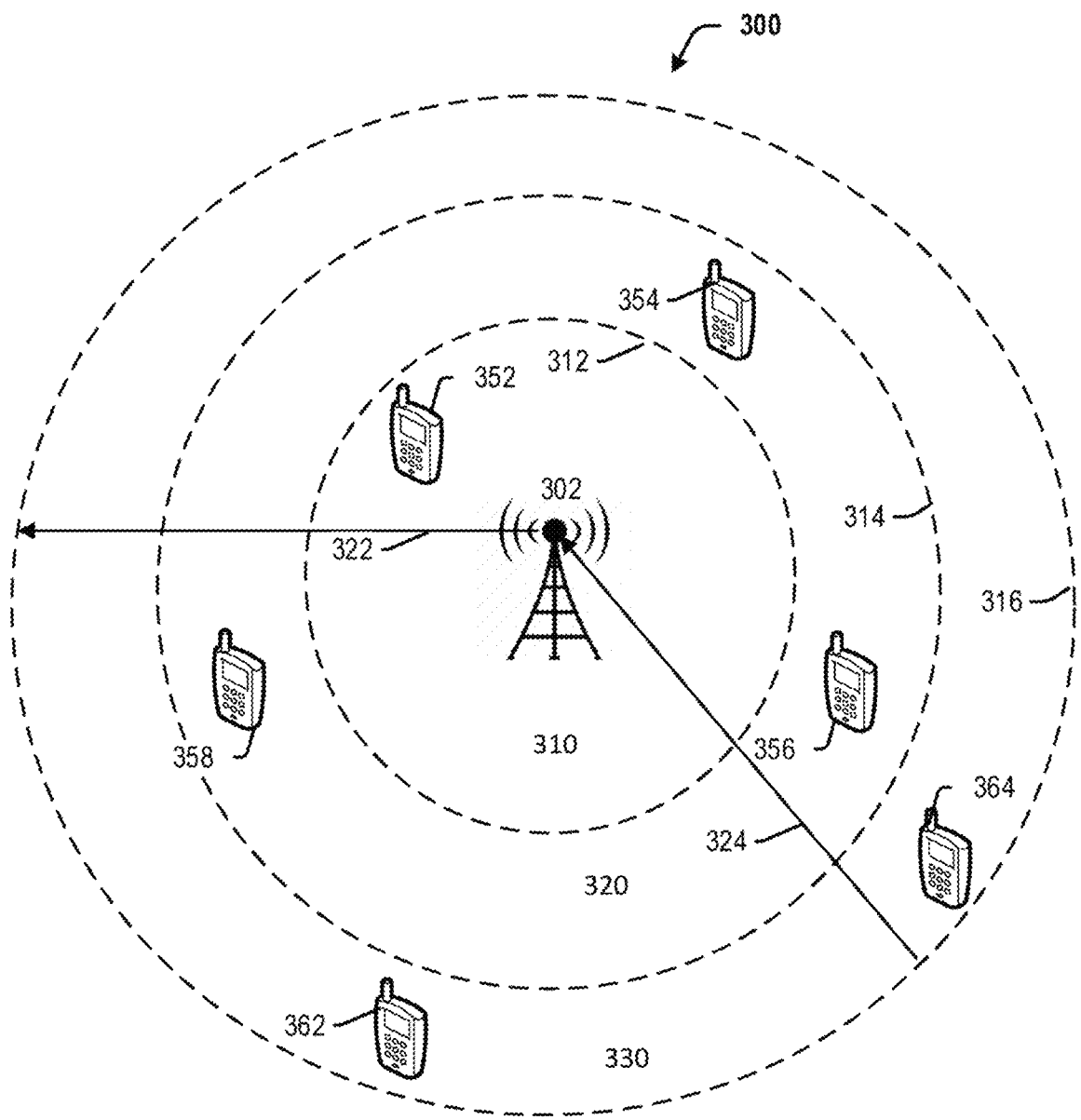
FIG. 3 depicts areas within a network having different signal performance parameter ranges in accordance with disclosed embodiments.

FIG. 3 depicts an exemplary environment 300 for embodiments set forth herein. A single access node 302 may deploy one or more RATs. Various areas may be predefined within a coverage area 316 of the access node 302. A first area 310 may be defined between the access node 302 and a boundary 312. A second area 320 may be defined between boundaries 312 and 314, and a third area 330 may be defined between boundary 314 and boundary 316. Boundary 316 may correspond with an edge of a coverage area of access node 302. As explained above, signal parameters may vary between the access node 302 and the cell edge. For example, as shown by arrow 322, path loss may increase moving from area 310 to area 320 and to area 330, which may be areas further from the access node, but may also be areas that are not further from the access node, but instead may be areas confronted with environment or geographical signal barriers. As shown by arrow 324, RSRP and/or signal to noise plus interference (SINR) or carrier to interference plus noise ratio (CINR) may decrease with distance from area 310 to area 320 and from area 320 to area 330. This may be due to distance from the access node or based on other factors such as geographical or environment factors impacting signal performance. Thus, the boundaries 312, 314, and 316 may be selected based on the signal parameters, such as path loss, RSRP, SINR, and/or CINR.

In technologies deployed by the access node 302 such as NB-IoT and Cat M1, a CE feature may be provided. A base level (CE level 0) 310 and two coverage extension levels. CE level 1 320, and CE level 2 330 may be provided. Logic provided in the network may choose the areas for the CE levels based on signal conditions, such as RSRP, CINR, SINR, and/or path loss. In the CE areas CE level 1 and CE level 2, coverage is improved by increasing a number of repetitions in the uplink and downlink. Reliable coverage enhancement is achieved by the repeated transmission of data and control signaling. Each transmission can be configured to repeat for a designated number of times in order to achieve higher success opportunities at the desired coverage level. Thus, transmissions in CE level 2 330 may be configured to be repeated a greater number of times than transmissions in CE level 1 320. Likewise, transmission is CE level 1 320 may be configured to be repeated a greater number of times than transmissions in CE level 0 310. When path loss at the desired coverage is high or RSRP, CINR, or SINR is low relative to other regions within the coverage area, a greater number of repetitions can be configured.

Although the CE levels and predefined areas are illustrated as being a particular distance from the access node, it should be noted that the areas are selected based on signal parameters and therefore are not necessarily proportionately distant from the access node 302. For example, in outdoor areas, outside of buildings, coverage extension may not be required as signal parameters may be strong. In indoor spaces, areas above ground may not require coverage extensions, but areas underground will likely require a coverage extension. For example, CE level 0 might be located outside, CE level 1 might be located on an upper floor of a building, and CE level 2 might be located in a basement of a building. More energy is required to transmit signals in coverage extension areas. More repetitions and a longer round trip time between sending and receiving are also generally required in coverage extension areas.

In operation, UE 352 nay be operating within area 310, UEs 354, 356, and 358 may operate within area 320, and UEs 362 and 364 may operate within area 330. The UEs may be connected to the access node 302, using a particular technology, for example NB-IoT technology. A processor within the access node 302 or other processor in the system may monitor a number of UEs connected using the technology or alternatively or additionally may monitor a percentage of resource block usage by the existing UEs connected using the particular technology. The access node 302 may further set a first threshold for resource block usage, for example 50%. If the access node 302 determines that the UEs connected with the access nodes using NB-IoT technology are using 50% of their allotted resource blocks, the access node may restrict any further connections from NB-IoT UEs in area 330, which may be CE level 2. While the access node may continue to serve the connected UEs and accept connection requests from NB-IoT UEs in areas 310 and 320, it will dynamically restrict access to area 330 as long as the resource usage by existing NB-IoT UEs continues to meet the predetermined threshold of resource usage.

Additionally, the access node 302 may set a second resource usage threshold that may be higher than the first resource usage threshold. The second resource usage threshold may, for example, be 80%. Thus, after determining that the resource usage meets the first threshold, the access node 302 may also determine if the resource usage meets the second threshold, which is higher than the first usage threshold. Upon finding that the resource usage meets the second predetermined threshold, the access node may also restrict access to area 320. Thus, while the access node 302 may continue to serve UE's already connected, it may restrict additional UEs connecting from both area 320 and area 330 in order to optimize network resources. This process may be performed dynamically, and monitoring may be continuous, so that when the thresholds are no longer met, the access node will connect with UEs in all of areas 310, 320, and 330.

Figure 4:
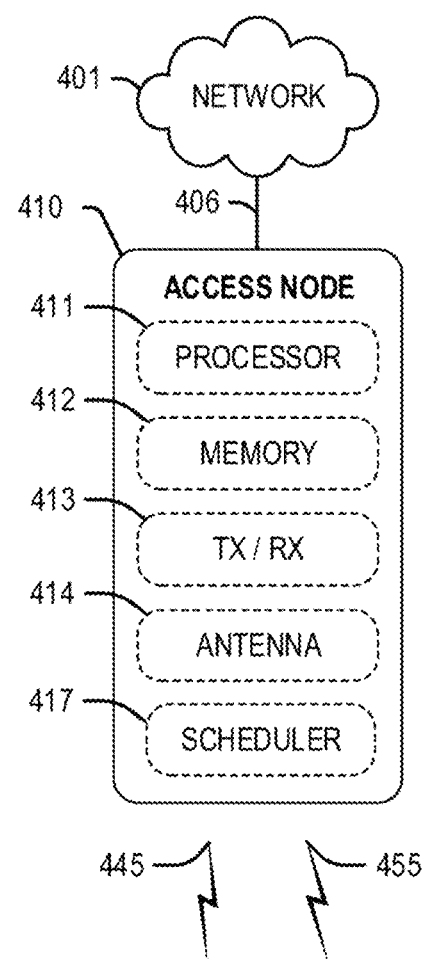
FIG. 4 depicts an access node in accordance with the disclosed embodiments.

FIG. 4 depicts an exemplary access node 410. Access node 410 may comprise, for example, a macro-cell access node, such as access node 410 described with reference to FIG. 1. Access node 410 may be connected to a network 401 using communication link 406. Access node 410 is illustrated as comprising a processor 411, memory 412, transceiver 413, antenna 414, and scheduler 417. Processor 411 executes instructions stored on memory 412, while transceiver 413 and antenna 414 enable wireless communication with other network nodes, such as wireless devices and other nodes. For example, access node 410 may be configured to detect wireless devices located in different predefined areas and monitor resource usage of the devices. The access node 410 may further be configured to dynamically restrict access to one or more of the predefined areas based on resource usage of the connected wireless devices. Scheduler 417 may be provided for scheduling resources based on the presence of the wireless devices. These features may be enabled by access node 410 comprising two co-located cells, or antenna/transceiver combinations that are mounted on the same structure. Network 401 may be similar to network 201 discussed above. Wireless communication links 445 and 455 may provide communication with the access node 410 over one or more RATs. The wireless devices may operate in NB-IoT mode or Cat M1 mode enabling the wireless devices to communicate with access node 410 over a relatively narrow bandwidth.

Figure 5:
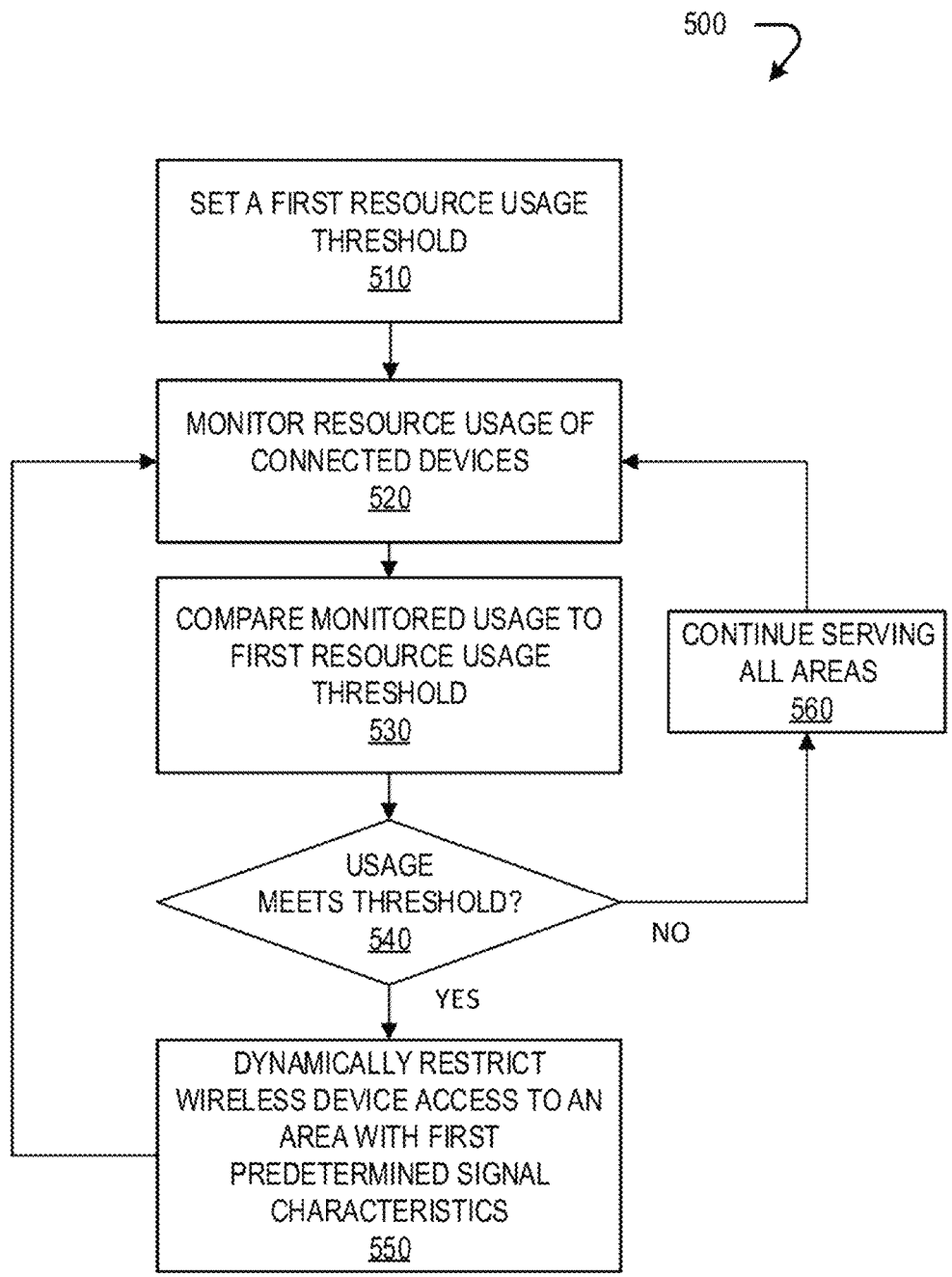
FIG. 5 depicts an exemplary method for optimizing network resources in accordance with disclosed embodiments.

Further, instructions stored on memory 412 can include instructions for dynamically restricting wireless device access to predefined areas which will be further explained below with reference to FIGS. 5 and 6. The instructions may facilitate setting definition of resource usage thresholds, monitoring of resource usage relative to the thresholds, and restriction of wireless device access from predefined areas based on the comparison of utilized resources with the predetermined resource usage thresholds. If the monitored values meet predetermined thresholds, the instructions may dictate dynamically restricting additional wireless devices from connecting to the access node in one or more of the predefined areas.

The disclosed methods for dynamically restricting wireless devices from connecting to an access node based on resource usage are further discussed with reference to FIGS. 5-7. FIG. 5 illustrates an exemplary method 500 for dynamically restricting wireless devices from accessing a predefined area when a first resource usage threshold is met. The method may occur in dynamically in real time or at predetermined intervals. Method 500 may be performed by any suitable processor discussed herein, for example, a processor included in access node or base stations 110, 120, 210, 220, or processor 411 included in access node 410, or a processor included in controller node 204. For discussion purposes, as an example, method 500 is described as being performed by a processor included in access node 410.

Method 500 starts in step 510 when the access node 410 sets a first resource usage threshold. The first resource usage threshold may be determined based on the number of resources blocks allocated to a particular technology. For example, if a small number of resource blocks is allocated, the threshold might be set to a lower percentage, such as 50% usage. If a larger number of resource blocks is allocated, the threshold may be set to a larger percentage, such as 70%.

In step 520, the access node monitors resource usage of connected wireless devices. For example, the access node may monitor aggregate resource block consumption by connected wireless devices.

In step 530, the access node compares the monitored resource usage to the first resource usage threshold. For example, if the first resource usage threshold is 50%, and the monitored resource usage is 40%, then in step 540, the access node determines that the monitored resource usage does not meet the first threshold. Alternatively, if the monitored resource usage is 60% in step 520, when the access node compares the monitored resource usage of 60% to the 50% threshold, the access node determines that the monitored resource usage meets the predetermined threshold in step 540.

Based on the determination in step 540, if the threshold is not met, the access node continues to serve wireless devices from all areas in step 560. Thus, as long as the threshold is not met, wireless devices requesting to connect from any location will be permitted to communicate with the access node using the particular RAT. In step 520, the access node returns to monitoring. However, if the threshold is met in step 540, the access node dynamically restricts wireless device access to at least one predefined area with predetermined signal characteristics in step 550. For example, the access node may restrict wireless device access to an area with path loss above a preset number. Alternatively, the access node may dynamically restrict wireless device access to a predefined area having RSRP below a certain number. Combinations of RSRP and path loss values may also be utilized as the predetermined signal characteristics. Further, the access node may restrict wireless device access to CE level 2 when three CE levels (0, 1, and 2) are defined with respect to the access node. Thus, devices already connected to the access node continue receiving services and additional wireless devices in CE level 0 and CE level 1 will be able to connect to the access node 410. However, wireless devices in the restricted area, e.g., CE level 2 will not be able to connect unless monitored resource usage falls below the predetermined threshold in step 520.

Figure 6:
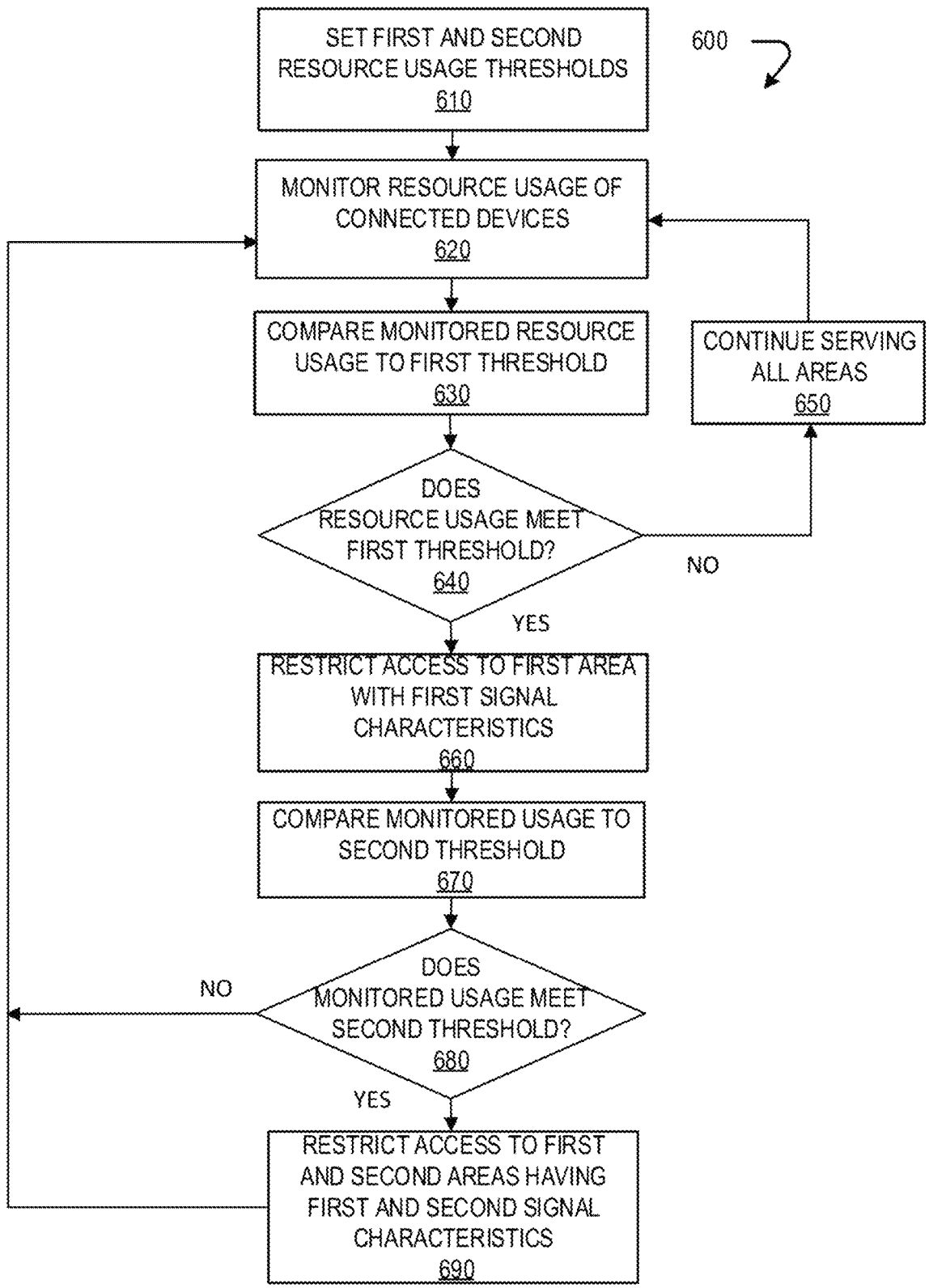
FIG. 6 depicts another exemplary method for optimizing network resources in accordance with disclosed embodiments.

The method of FIG. 6 illustrates a further method 600 for dynamically restricting UE access to multiple predefined regions based on signal characteristics of the regions. Method 600 may be performed by any suitable processor discussed herein, for example, a processor included in access node or base stations 110, 120, 210, 220 or processor 411 included in access node 410, or a processor included in controller node 204. For discussion purposes, as an example, method 600 is described as being performed by a processor included in access node 410.

In step 610, the access node 410 sets a first resource usage threshold and a second resource usage threshold. The first resource usage threshold may be set as a percentage of resource block usage as set forth above with respect to the method of FIG. 5. Thus, the threshold may be set, for example, to 50% resource block utilization. The determination of the threshold may be made at the access node 410, for example, based on a number of allocated resource blocks set forth above with respect to step 510 in FIG. 5. Further, in step 610, the access node 410 sets a second resource usage threshold. In embodiments set forth herein, the second resource usage threshold is higher than the first resource usage threshold. For example, the second resource usage threshold may be 80%.

In step 620, the access node 410 monitors resource usage of connected devices. For example, if the devices are NB-IoT devices, the access node 410 monitors the aggregate resource block usage of resource blocks allocated to NB-IoT and determines a percentage of the resource blocks in use. In step 630, the access node 410 compares the monitored resource usage to the first threshold as set forth with respect to FIG. 5. If the monitored resource usage does not meet the first threshold in step 640, the access node 410 continues serving all areas in step 650. In other words, the access node 410 allows all requesting Nb-IoT devices to connect, regardless of their location. The access node 410 then continues monitoring the resource usage in step 620. However, if the monitored resource usage meets the first threshold in step 640, the access node 410 restricts access to a first area or region having first signal characteristics in step 660. As set forth above with respect to FIG. 5, the signal characteristics may be related to path loss and/or RSRP. For example, the restricted region has a higher path loss and or lower or RSRP than other regions. The restricted region may also correspond to a CE level, for example, CE level 2.

After determining that the monitored resource usage meets the first threshold, the access node 410 compares the monitored resource usage to the second threshold in step 670. If the resource block usage does not meet the second threshold in step 680, the access node 410 continues monitoring resource usage in step 620. However, if the resource usage does meet the second threshold in step 680, the access node 410 restricts wireless device access to first and second areas having first and second signal characteristics in step

680. The first and second areas may, for example, areas with high path loss and low RSRP. For example, the first area may have pathloss in a first range and the second area may have pathloss in a second range below the first range. The first area may correspond for example to CE level 2 and the second area may correspond, for example to CE level 1. Thus, wireless device access may be restricted in step 690 from connecting in two regions. While the access node 410 may continue to serve devices that are already connected from all regions, it does not allow any additional wireless devices to connect from the restricted areas.

Figure 7:
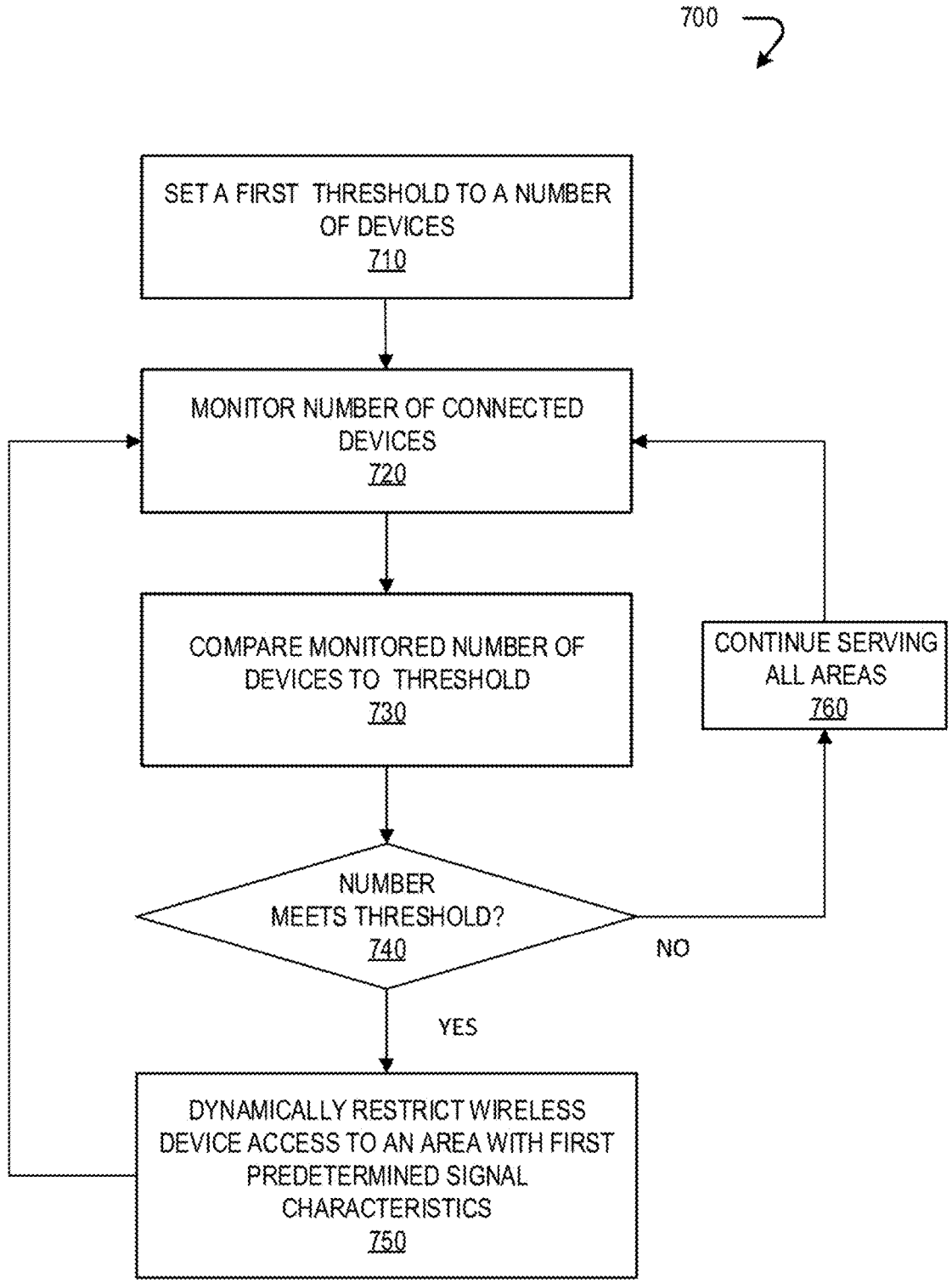
FIG. 7 depicts another exemplary method for optimizing network resources in accordance with disclosed embodiments.

FIG. 7 depicts another exemplary method 700 for optimizing network resources in accordance with disclosed embodiments. Method 700 may be performed by any suitable processor discussed herein, for example, a processor included in access node 110, 120, 210, 220, or processor 411 included in access node 410, or a processor included in controller node 204. For discussion purposes, as an example, method 700 is described as being performed by a processor included in access node 410.

In the embodiment of FIG. 7, the access node 410 may set the first resource usage threshold to a number of RRC connected wireless devices rather than a percentage of resource block usage in step 710. However, the particular number of wireless devices set as a threshold may be determined based on a number of allocated resource blocks. Thus, if more resource blocks are available, the predetermined threshold may be a higher number of wireless devices than if fewer resource blocks are available.

In step 720, the access node 410 monitors the number of connected devices. The access node 410 may limit the monitoring to a number of connected devices utilizing a particular RAT. In step 730, the access node 410 compares the monitored number of devices to the threshold set in step 710. If the monitored number of devices does not meet the threshold in step 740, the access node 410 continues serving all areas in step 760 and allows all devices requesting connections from all of the areas to connect. The access node continues monitoring in step 720.

However, if the monitored number meets the threshold in step 740. The access node 410 dynamically restricts wireless device access to an area with first predetermined signal characteristics in step 750. More specifically, the access node 410 may restrict additional wireless devices requesting connection over a particular RAT from connecting to the access node from a particular region. The region may be characterized by predetermined signal characteristics, such as high path loss or low RSRP and may correspond to CE level 2.

In some embodiments, methods 500, 600, and 700 may include additional steps or operations. Furthermore, the methods may include steps shown in each of the other methods. As one of ordinary skill in the art would understand, the methods 500 and 600 may be integrated in any useful manner. Additionally, in order to optimize network resources, the methods disclosed may be performed for multiple access nodes and RATs.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for optimizing network resources, the method comprising:
    setting a first resource usage threshold for wireless devices connected to an access node using an Internet of Things (IoT) radio access technology (RAT), the IoT RAT offering coverage enhancement (CE) levels utilizing different levels of message repetition;
    monitoring resource usage for the IoT RAT of the connected wireless devices;
    comparing the monitored resource usage to the first resource usage threshold; and
    dynamically restricting wireless device access to the IoT RAT for at least one area characterized by signal performance parameters in a first predetermined range and corresponding to a highest CE level utilizing a highest message repetition when the monitored resource usage meets the first resource usage threshold.

2. The method of claim 1, further comprising, setting a second resource usage threshold for the connected wireless devices, and comparing the second resource usage threshold to the monitored resource usage.

3. The method of claim 2, further comprising dynamically restricting wireless device access to at least two areas characterized by the signal performance parameters falling in two different predetermined ranges when the monitored resource usage meets the second resource usage threshold, and wherein the at least two areas correspond to the two highest coverage enhancement levels.

4. The method of claim 3, wherein the wireless devices operate within three areas corresponding to CE levels including CE level 0, CE level 1, and CE level 2, wherein CE level 0 has a first signal performance parameter range, CE level 1 has a second signal performance parameter range, and CE level 2, has a third signal performance parameter range wherein pathloss in CE level 2 is greater than pathloss in CE level 1 and pathloss in CE level 1 is greater than pathloss in CE level 0.

5. The method of claim 4 further comprising restricting access to the CE level 2 when the monitored resource usage meets the first resource usage threshold.

6. The method of claim 5, further comprising restricting access to the CE level 1 and CE level 2 when the monitored resource usage meets the second resource usage threshold.

7. The method of claim 1, wherein the monitored resource usage is a percentage of physical resource block (PRB) utilization.

8. The method of claim 1, wherein the monitored resource usage is a number of wireless devices connected to the access node.

9. The method of claim 1, wherein the wireless devices are Internet of Things (IoT) devices.

10. The method of claim 9, wherein the wireless devices are one of narrowband (NB) IoT devices and Category (Cat) M1 devices.

11. The method of claim 1, further comprising comparing the monitored resource usage to a second resource usage threshold when the monitored resource usage meets the first resource usage threshold.

12. The method of claim 1, wherein dynamically restricting wireless device access includes preventing additional wireless devices from connecting to the at least one area using the IoT RAT.

13. A system for optimizing network resources, the system comprising:
   an access node including at least one processor programmed to perform steps including:
      setting a first resource usage threshold for wireless devices connected to the access node using an Internet of Things (IoT) radio access technology (RAT), the IoT RAT offering coverage enhancement (CE) levels utilizing different levels of message repetition;
      monitoring resource usage for the IoT RAT of the connected wireless devices;
      comparing the monitored resource usage to the first resource usage threshold; and
      dynamically restricting wireless device access to the IoT RAT for at least one area characterized by signal performance parameters in a first predetermined range and corresponding to a highest CE level utilizing a highest message repetition when the monitored resource usage meets the first resource usage threshold.

14. The system of claim 13, wherein the processor is further programmed to set a second resource usage threshold for the connected wireless devices and compare the second resource usage threshold to the monitored resource usage when the monitored resource usage meets the first resource usage threshold.

15. The system of claim 14, wherein the processor is additionally programmed to dynamically restrict wireless device access to at least two areas characterized by path loss in two predetermined ranges when the monitored resource usage meets the second resource usage threshold, wherein the at least two areas correspond to the two highest CE levels.

16. The system of claim 15, further comprising three different areas, each having a corresponding predetermined pathloss range.

17. The system of claim 16, wherein the processor is further programmed to restrict wireless device access to one of the three different areas characterized by a highest pathloss when the monitored resource usage meets the first resource usage threshold.

18. A method for optimizing network resources, the method comprising:
   setting a first resource usage threshold and a second resource usage threshold for wireless devices connected to an access node using an Internet of Things (IoT) radio access technology (RAT), the IoT RAT offering coverage enhancement CE levels utilizing different levels of message repetition, wherein the first and second resource usage thresholds comprise a PRB utilization percentage;
   monitoring resource usage for the IoT RAT of the connected wireless devices;
   comparing the monitored resource usage to the first resource usage threshold;
   comparing the monitored resource usage to the second resource usage threshold when the monitored resource usage meets the first resource usage threshold; and
   dynamically restricting wireless device access the IoT RAT for to a first area characterized by signal performance parameters in a first predetermined range and corresponding to a highest coverage enhancement level utilizing a highest message repetition when the monitored resource usage meets the first resource usage threshold and not the second resource usage threshold and dynamically restricting wireless device access to the first area and a second area having signal performance parameters in a second predetermined range corresponding to a second highest coverage enhancement level when the monitored resource usage meets the first and second resource usage thresholds.

19. The method of claim 18, further comprising setting the second resource usage threshold to be greater than the first resource usage threshold.

20. The method of claim 19, wherein the connected wireless devices are NB-IoT devices.

* * * * *